Dec. 9, 1969   R. A. WOOD   3,482,686
SORTING APPARATUS

Filed July 17, 1967   2 Sheets-Sheet 1

INVENTOR:
RICHARD A. WOOD
BY
Curtis, Morris & Safford
ATTORNEYS.

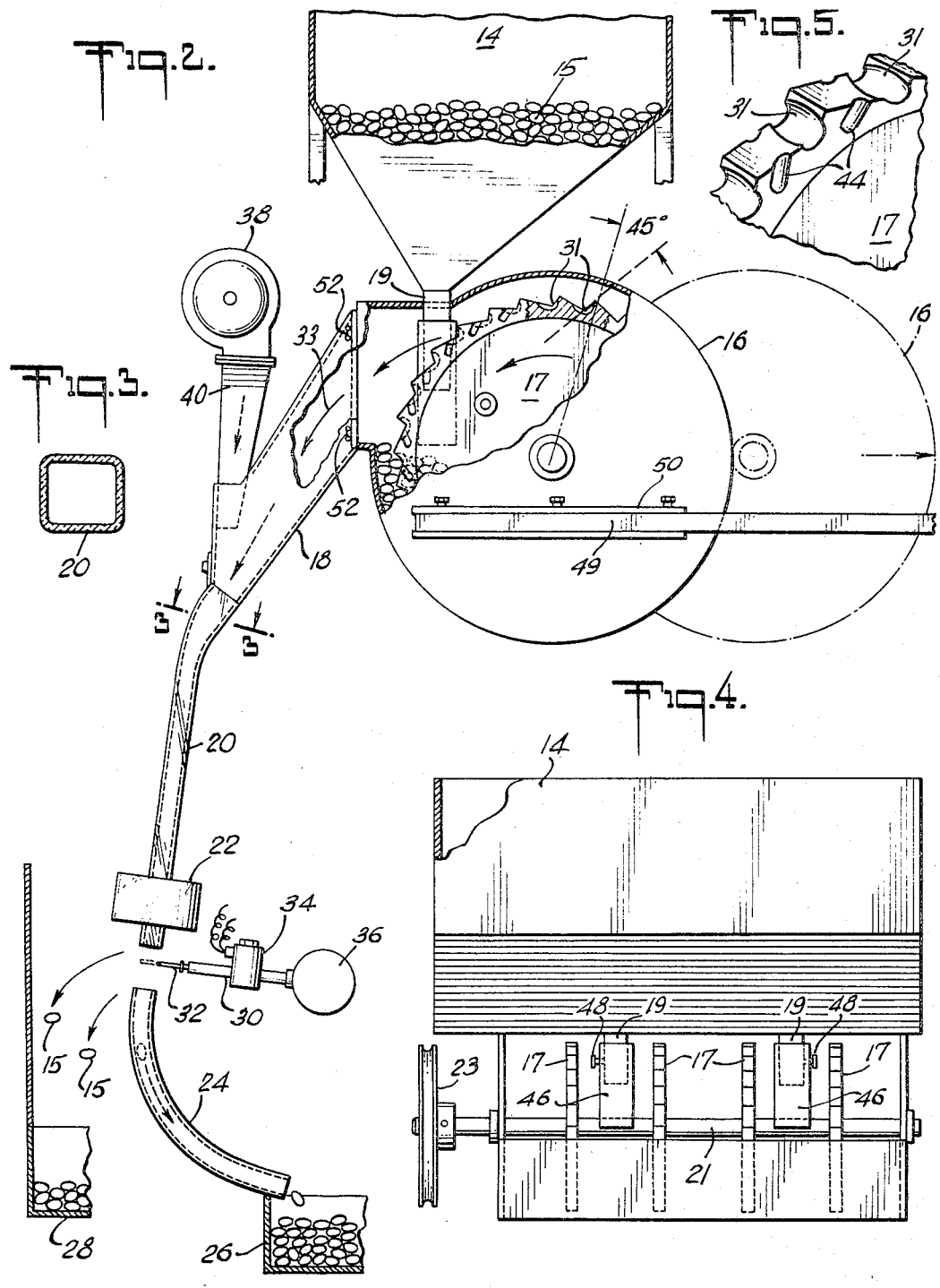

United States Patent Office 3,482,686
Patented Dec. 9, 1969

3,482,686
SORTING APPARATUS
Richard A. Wood, Sunnyvale, Calif., assignor to Elcemco, Inc., Panama, Panama, a corporation of Panama
Filed July 17, 1967, Ser. No. 653,861
Int. Cl. B07c 3/14, 5/34
U.S. Cl. 209—73      8 Claims

ABSTRACT OF THE DISCLOSURE

Apparatus for sorting objects such as coffee beans, peas, and the like. The objects are gravity-fed from a storage bin into a cylindrical hopper through spouts which maintain the objects at a given level in the hopper. Feed wheels rotating in the hopper have pockets which pick up the objects one-at-a-time and throw them into funnel-shaped tubes which guide the objects through photoelectric devices which deflect undesirable objects from the path taken by desirable objects, thus separating the objects. Blowers force air down the tubes so as to carry the objects past the photoelectric devices at a predetermined desired speed, thus improving the sorting accuracy of the machine.

---

The present invention relates to apparatus for sorting objects from one another; more particularly, this invention relates to optical apparatus for sorting objects in accordance with the relative wavelength and/or intensity of illumination reflected by such objects, and especially to means for feeding the objects through the sorting apparatus.

The present invention constitutes an improvement of the sorting apparatus shown in U.S. Patent 3,283,896. In the sorting device shown in that patent, objects such as coffee beans, peas, etc., are fed one-at-a-time through a photoelectric separating device which measures the intensity of light reflected by the beans. The separating device deflects undesirable objects such as beans which are either too light or too dark from the path taken by desirable objects, thus sorting the desirable from the undesirable objects.

In such photoelectric sorting equipment, one problem lies in feeding the objects through the sorter rapidly while maintaining a high degree of sorting accuracy. Accordingly, it is a principal object of the present invention to provide photoelectric sorting apparatus in which the objects are fed rapidly and automatically through the sorting machine in a manner such as to maintain a high degree of sorting accuracy. Other objects of the invention will become apparent from the description and drawings that follow.

In the drawings:

FIGURE 2 is a partially schematic side elevation view of the apparatus shown in FIGURE 1;

FIGURE 3 is a cross-sectional view taken along line 3—3 of FIGURE 2;

FIGURE 4 is a front, partially broken-away view of a portion of the equipment shown in FIGURE 2; and FIGURE 5 is a perspective view of a component of the structure shown in FIGURE 2.

Figure 1:
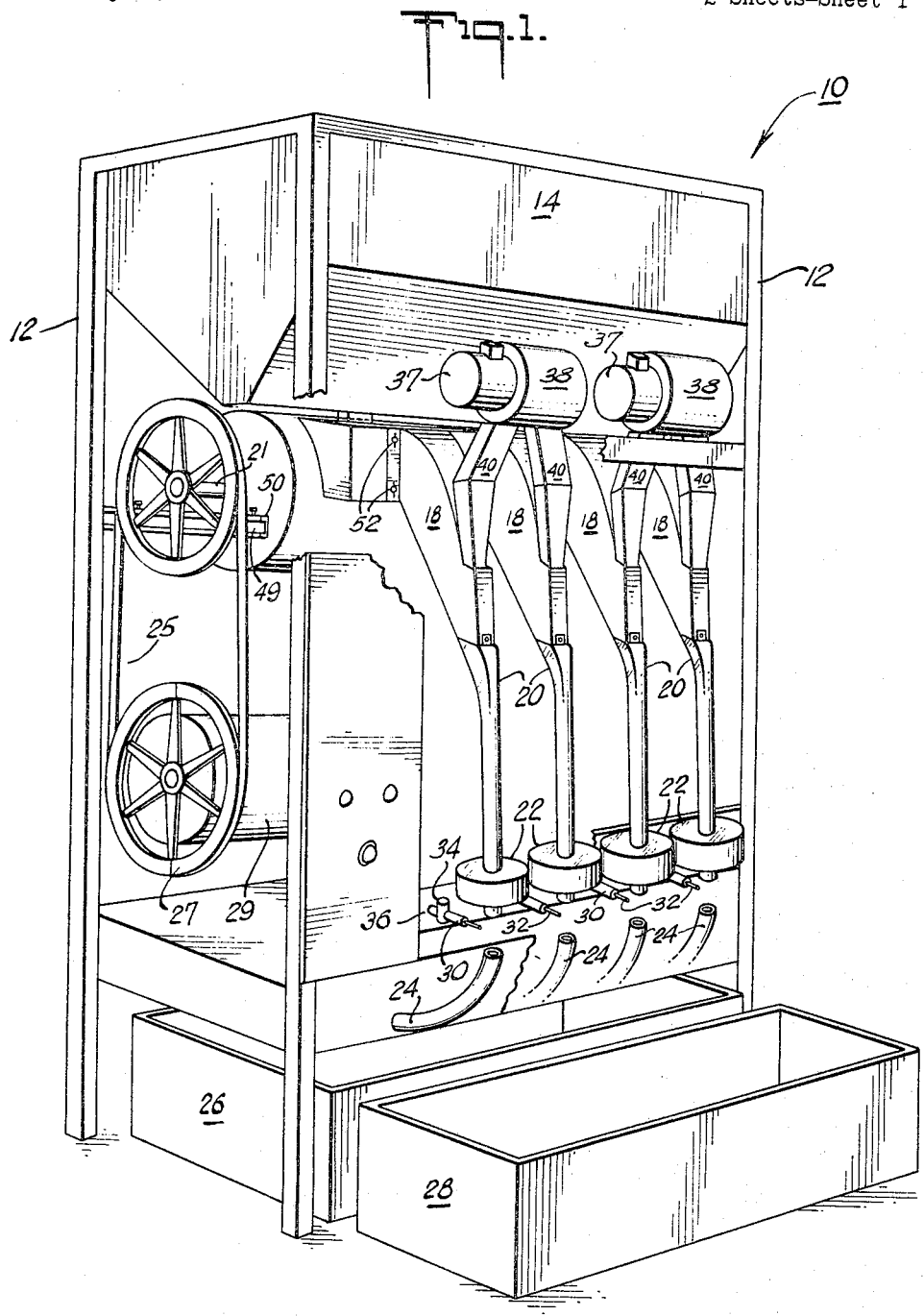
FIGURE 1 is a perspective, partially broken-away view of sorting apparatus constructed in accordance with the present invention.

The sorting machine 10 shown in FIGURES 1 and 2 includes a frame 12 at the top of which is located a storage bin 14 in which objects 15 (see FIGURE 2) to be sorted are stored. The objects 15 flow downwardly under the force of gravity through the funnel-shaped bottom of the bin 14 and into a cylindrical hopper 16 through a pair of feed spouts 19 (see FIGURE 4).

Referring now to FIGURE 4, rotatably mounted on a shaft 21 in the hopper 16 are four feed wheels 17. The feed wheels 17 are rotated at a constant speed by means of a pair of pulleys 23 and 27 (see FIGURE 1), a belt 25, and an electric motor 29. As is shown in FIGURES 2 and 5, the wheels 17 have pockets 31 spaced around their rims. As each wheel rotates counter-clockwise as shown in FIGURE 2, each of the pockets 31 picks up one of the objects 15 and throws it along the dashed line 33 into a chute 18 which is attached to the hopper 16. There are four chutes 18, one for each feed wheel 17. Each chute 18 is generally funnel-shaped, with its small end inserted into the top of a funnel-shaped glass tube 20. Each glass tube 20 passes through a photoelectric viewing head 22 of the type disclosed in the aforementioned U.S. Patent 3,283,896.

Each object thrown from the feed wheel passes down the tube 20 and through the photoelectric viewing head 22. If it is not deflected from its path as it emerges from the viewing head 22, it enters a tube 24 which is curved towards the rear of the machine 10 and which delivers the objects into a receptacle 26 for desired objects. A miniature air cylinder 30 is provided for each of the tubes 20 and photoelectric heads 22. When the photoelectric head 22 and its associated electrical circuitry (not shown) determines that the object is too light or too dark, or is undesirable for some other reason, an electrical signal is sent to a solenoid valve 34 which allows air to enter the air cylinder 30 from a storage tank 36 or other suitable compressed air source. The air cylinder 30 has a small plunger 32 (see FIGURE 2) which is rapidly thrust by the compressed gas into the path of the object emerging from the potoelectric head 22. The arm 32 thus deflects the object and prevents it from passing down the tube 24. Instead, the object falls into the receptacle 28 for bad or undesired objects. The air cylinder has a spring return for the plunger 32, and is very fast-acting.

In accordance with one aspect of the present invention, a pair of centrifugal blowers 38 is provided. Each blower has two exit conduits 40 each of which tapers gradually to a smaller opening at its lower end 42. The end 42 is fitted into the chute 18 just above the entrance to the glass funnel 20. The blowers 38 force a stream of air down each of the tubes 20. The stream of air catches the object 15 and carries it down the tube. This is highly advantageous since the object 15 acquires the velocity of the air stream and is not dependent upon gravity to feed it down the tube. Thus, the present invention gives the object 15 a velocity which is predictable and consistent as it passes through the viewer head 22, unlike the velocity of objects in the prior gravity feed systems. This very substantially improves the sorting accuracy of the machine.

The accuracy of the sorting machine is further improved by the provision of flat internal side-walls in the upper funnel-shaped portion of the tube 20. As is shown in FIGURE 3, the tube 20 preferably has a rectangular cross-sectional shape. The provision of flat internal walls in the tube inlet prevents the object from spinning and being slowed down as it moves downwardly in the tube. This further improves the sorting accuracy of the machine.

The pockets 31 in the wheel 17 are contoured to the shape of the objects which fit into them. Each of the surfaces into which the pockets are cut forms a relatively large angle with the diameter line of the wheel 17 at the location of the pocket. This angle preferably is 45°, as is shown in FIGURE 2. The objects 15 moves along with the wheel in the hopper 16. Those which are not picked up in the pockets 31 fall back downwardly and are recirculated in the hopper.

A small rounded depression 44 is located on each side of the wheel 17 adjacent each of the pockets 31. The depressions 44 assist in causing the objects 15 to circulate with the wheel 17. This aids in causing the objects to enter the pockets by tending to cause the speed of the circulating objects to approach that of the wheel so that the objects get caught and remain in the pockets 31 more readily. The rims of the wheels 17 are spaced from the interior of the hopper 16 so as to further facilitate circulation.

The level of objects in the hopper 16 cannot be allowed to become too high because a certain amount of space must be provided in which objects not caught in the pockets 31 are allowed to drop back into the hopper 16. Therefore, in accordance with another feature of the present invention, the level of objects 15 in the hopper 16 is maintained by means of adjustable chutes 46 (see FIGURE 4) which fit slidably over the delivery chutes 19. As is shown in FIGURE 4, each of the chutes 46 can be moved up and down on the chute 19, and can be fastened in a desired position by means of a set-screw 48. Since objects will not fall out of any chutes 46 when the level of the objects in the hopper 16 is even with the bottom of the chute, adjustment of the heights of the chutes 46 effectively adjusts the level of the objects 15 in the hopper.

Since the pockets 31 ideally are shaped specifically for a given type of object to be sorted, it is desirable to be able to change the feed wheels in order to sort different products. The feed wheels in the sorting machine 10 are changed quite readily in accordance with another feature of the present invention. The hopper 16 is mounted in the frame 12 by means of slides 50 which slide upon horizontal portions 49 (see FIGURE 1) of the frame. By this means the whole hopper 16 may be moved horizontally out of the rear of the machine 10. The chutes 18 easily are removed from the hopper 16 by means of wing-nuts 52 which normally secure the two components together. The chutes 46 may be removed by loosening the set-screws 48. Thus, merely by loosening the wing-nuts 52 and set-screws 48, the hopper 16 may be replaced rapidly and easily.

The advantages of the present invention are numerous. The machine 10 sorts objects rapidly and accurately. Moreover, the machine 10 is relatively compact and operates on a relatively small amount of power. What is more, the machine 10 is relatively inexpensive to manufacture. Not only do the blowers 38 enhance the accuracy of sorting of the machine, but they also achieve the unexpected result of blowing chaff and other light-weight debris upwardly out of the tube 20 so that it does not pass through the photoelectric viewing head and is separated out from the desired objects.

The above description of the invention is intended to be illustrative and not limiting. Various changes or modifications in the embodiments described may occur to those skilled in the art.

What is claimed is:

1. In a photoelectric sorting machine having a photoelectric device for separating objects from one another while said objects are traveling past said device one-at-a-time, a conduit at least the initial portion of which has flattened internal side-walls which form angles with one another for guiding said objects past said device, feeding means for feeding said objects into said conduit one-at-a-time, and flow means for forcing a fluid through said conduit in the direction of travel of said objects therethrough.

2. Apparatus as in claim 1 in which said feeding means includes a wheel with pockets in its periphery and depressions in the side of the wheel at positions adjacent said pockets, and a bin in which said wheel is rotatably mounted.

3. Apparatus as in claim 1 in which said photoelectric device includes a photelectric viewing unit and an air cylinder, a source of compressed air, and a solenoid valve controlled by said viewing unit and connecting said air cylinder to said source, said air cylinder having a spring-return shaft positionable to deflect selected objects from their paths of travel through said apparatus.

4. Apparatus as in claim 1 in which said feeding means includes a wheel with pockets spaced around its periphery, each of said pockets being shaped to pick up one object from a bin and throw it into said conduit, said flow means comprising an air blower with an outlet which directs the air flow from said blower into said conduit at approximately the position at which objects flying from said wheel enter said conduit, said conduit having a funnel shape with a substantially rectangular cross-section.

5. Apparatus as in claim 4 including depressions each located adjacent one of said pockets on the side of said wheel.

6. In a photoelectric sorting machine having a photoelectric device for separating objects from one another while said objects are traveling past said device one-at-a-time, a conduit for guiding said objects past said device, feeding means for feeding said objects into said conduit one-at-a-time, said feeding means comprising a cylindrical hopper with an exit opening, at least one rotary feed wheel rotatably mounted in said hopper, said wheel having pockets around its periphery each adapted to pick up one object out of a supply of objects partially filling said hopper and throw said object through said exit opening, a storage bin positioned above said hopper and having an outlet spout for delivering objects from said bin to said hopper, the lowermost end of said spout being positionable at a pre-determined level in said hopper so as to maintain the supply of objects in said hopper at said level.

7. Apparatus as in claim 6 in which said sorting machine includes a frame to which said bin is attached, and horizontal slide means for removably mounting said hopper in said frame, said spout being retractable to facilitate removal of said hopper.

8. Apparatus as in claim 7 including a plurality of sets of said wheels, conduits and photoelectric devices, said wheels being spaced along the longitudinal axis of said hopper, in which each of said pockets in said wheels is formed in a surface which forms a substantial angle with the diameter line of the wheel at the location of said pocket, and a plurality of other pockets in the side surface of said wheel, each of said other pockets being located adjacent one of the first-named pockets, and a plurality of said spouts located at spaced position along the axis of said hopper.

References Cited

UNITED STATES PATENTS 3,197,647   7/1965   Fraenkel _____ 209—111.7 X
3,283,896   11/1966  Jirik et al. _____ 209—111.7 X ALLEN N. KNOWLES, Primary Examiner U.S. Cl. X.R.

209—111.6